United States Patent [19]

Brown et al.

[11] 3,825,902

[45] July 23, 1974

[54] INTERLEVEL COMMUNICATION IN MULTILEVEL PRIORITY INTERRUPT SYSTEM

[75] Inventors: Wendell W. Brown; Michael I. Davis; Ralph M. Pipitone, all of Boca Raton, Fla.

[73] Assignee: International Business Machines Corporation, Armonk, N.Y.

[22] Filed: Apr. 30, 1973

[21] Appl. No.: 356,014

[52] U.S. Cl. .......... 340/172.5
[51] Int. Cl. .......... G06f 9/18
[58] Field of Search .......... 340/172.5

[56] References Cited

UNITED STATES PATENTS

| | | | |
|---|---|---|---|
| 3,543,242 | 11/1970 | Adams et al. | 340/172.5 |
| 3,573,852 | 4/1971 | Watson et al. | 340/172.5 |
| 3,611,307 | 10/1971 | Podvin et al. | 340/172.5 |

*Primary Examiner*—Raulfe B. Zache
*Attorney, Agent, or Firm*—Earl C. Hancock; Carl W. Laumann, Jr.; J. Jancin, Jr.

[57] ABSTRACT

A data processor has multiple sets of hardware each of which is capable of autonomously controlling a common storage and common logical control circuits to execute a program. The hardware sets are allocated priority levels and are preferentially employed for handling interrupt service requests. Any hardware set which is interrupted in processing by a higher priority input request retains its processing status and resumes processing when control of the common elements is returned to it. Apparatus is included for addressing the set associated with a different priority level than the current level so that this different level can be preempted for another task. The presence of an interrupted program in the preempted level can be detected and its critical status stored for restoration after completion of the preempting program.

11 Claims, 5 Drawing Figures

INTERLEVEL COMMUNICATION IN MULTILEVEL PRIORITY INTERRUPT SYSTEM

CROSS REFERENCE TO RELATED APPLICATIONS

Application Ser. No. 194,075 filed Oct. 27, 1971 and entitled, "Data Acquisition and Control System" by M. I. Davis, J. M. Loffredo, P. L. Rickard and L. E. Wise and assigned to the same assignee as this application describes a system environment in which this invention is particularly well suited.

BACKGROUND OF THE INVENTION

1. Field of the Invention

This invention relates to data processing equipment in general and the central processing unit (CPU) thereof in particular. The present invention is concerned with computer apparatus which must process any of a plurality of service requests which occur randomly but which has associated priority levels assigned to them. The present invention is especially useful in the environment of a multiple prioritized interrupt level processing computer wherein a series of groups of controlling elements are employed for different priority interrupt level handling in such a manner that the highest priority group present at any given time has control of the common storage and arithmetic or other logic units to the exclusion of the lower priority levels.

2. Description of the Prior Art

The central processing unit or CPU of a data processing system frequently must handle randomly occurring service requests from any of a plurality of request sources. It has been known to assign prioritization levels to these interrupt requests as a function of the importance associated with providing a response to the request. For many prior art processors, the presence of a higher level interrupt request than that which is currently being processed causes a response wherein the status of critical registers and conditions associated with the interrupted level are placed into a reserved area of main storage so that they can be retrieved and transferred to the controlling elements after the higher level interrupt has been serviced. The response time delay associated with the programming overhead for performing this storage and retrieval operation has been reasonably satisfactory for many data processing applications. However, the need for a closer approximation to a real time response becomes critical for some data processing applications such as for process control in particular. Accordingly, the referenced copending application Ser. No. 194,075 contains a significant breakthrough in improving the real time response of a CPU particularly useful in a process control or data acquisition environment. The cross referenced application describes a redundant hardware arrangement wherein the critical elements of a processor associated with execution of a program are duplicated for each of a multiplicity of priority levels, this configuration sometimes being referred to as a virtual machine. This permits the acceptance of a higher level interrupt request and processing of that request so that the interrupted critical elements are merely retained in isolation until the higher level process is completed. By this arrangement, it is possible not only to avoid the software time loss penalty associated with storage and retrieval but also to avoid the hazard of a programming failure to retrieve the interrupted program and reinitiate its execution.

The prior art multiple interrupt level hardware computer environment such as that described in the cross referenced co-pending application Ser. No. 194,075 does provide an increase in the real time response of a processor. However, the presence of interrupt processing on a lower priority level which has itself been interrupted prevents another interrupt from being interleaved on that level for processing until the level has been cleared. It has been possible to prioritize between levels with the multiple level apparatus by assigning an initial interrupt level for a given source at a relatively high priority but, once the interrupt has been accepted, to proceed with processing of that interrupt on a lower level. This has been effected by a program-originated interrupt buffer setting which effectively clears the higher level of the originating interrupt request and then places the lower level processing of that request in a queue at least behind the lower level interrupt which had itself been interrupted. However, there are occasions when it would be desirable to continue to suspend the lower level interrupted program until execution of yet another program on that same level has been completed. The only way this could be effected in the prior art devices was by completely destroying the contents of all the pertinent registers on the lower level and forcing acceptance of the programmed interrupt from the interrupt acceptance queue.

SUMMARY OF THE INVENTION

The present invention provides means for inspecting a priority level different from that which is currently being processed and determining its status. If the different level has been interrupted but yet another program is to be interleaved, the present invention includes means for determining that the lower level was in process as well as means for storing the status of the critical registers and conditions of that level along with means for initiating those registers so that they are automatically conditioned to process the preempting routine. The interrupted routine can be subsequently returned to the registers to continue with its processing at a later time. Thus, the present invention includes means for permitting a current level of priority interrupt processing to address a different level and store the contents of its registers if desired. The addressed level registers can be initiated by this same addressing mechanism. This makes it possible to inspect the status of an addressed interrupt level register and to decide upon whether or not to permit a preempting routine to intervene before completion of the interrupted routine.

Although this invention is most useful for inspecting and preempting/resuming interrupt operations on a level lower than the current level, the invention can likewise be employed to initiate processing of an interrupt on a higher level. However, it is preferable that the higher level not be interruptable by a lower level.

Accordingly, it is a primary object of the present invention to expand the flexibility of a multilevel interrupt driven hardware processor by permitting interlevel communication.

Another object of this invention is to provide a method and means for preempting processing of a program in a multilevel hardware processor so that an intervening program can be executed.

Still another object of this invention is to provide means for communicating with a different priority level from a current level in a multilevel processor organization so that the interrupted level can be returned to its processing status after completion of the preempting program.

The foregoing and other objects, features and advantages of the present invention will be apparent from the preferred embodiment of this invention as illustrated in the accompanying drawings.

DETAILED DESCRIPTION

Figure 1:
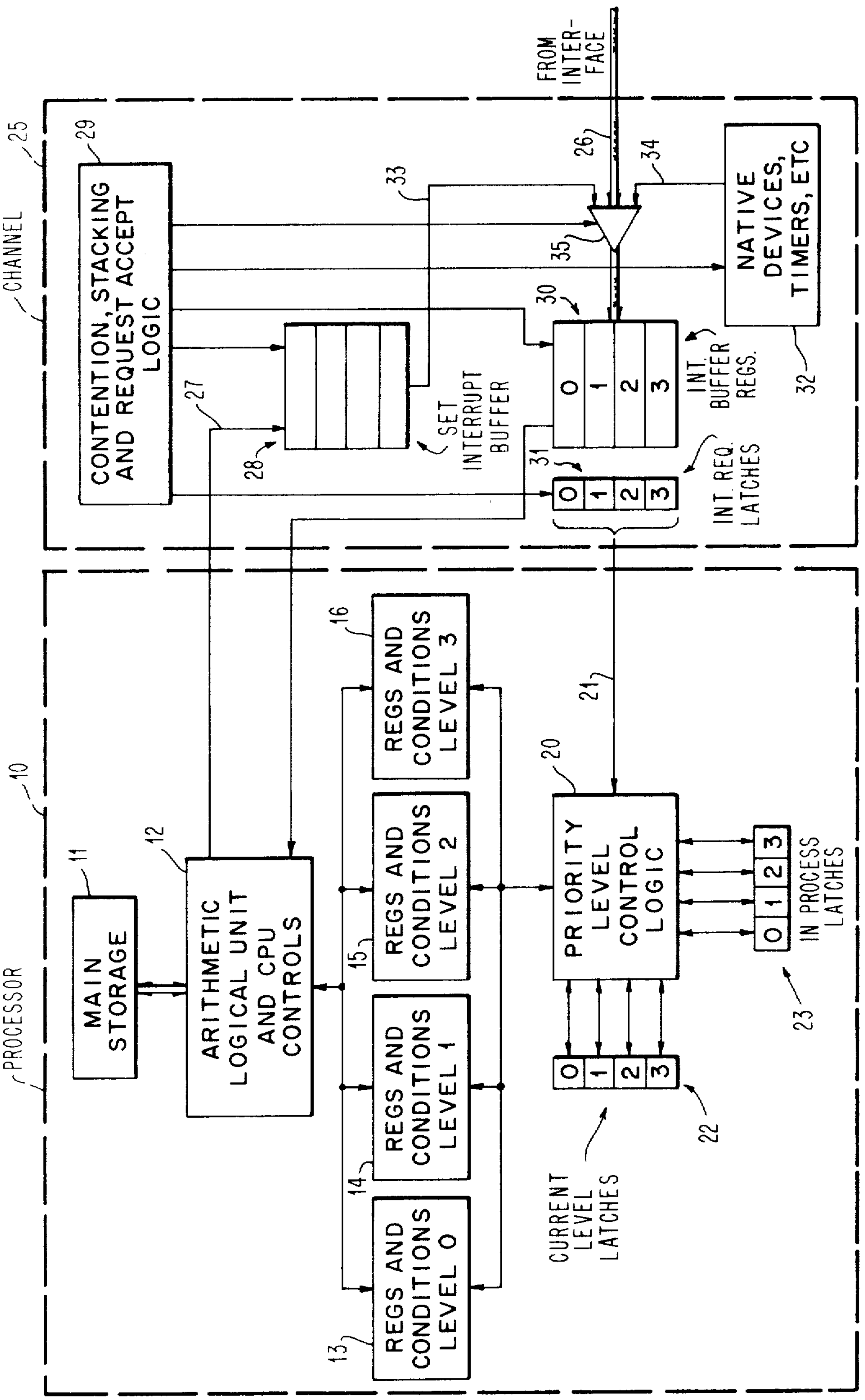
FIG. 1 shows the multiple priority level configuration of a processor and its associated channel for which the present invention provides an improvement.
Figure 2:
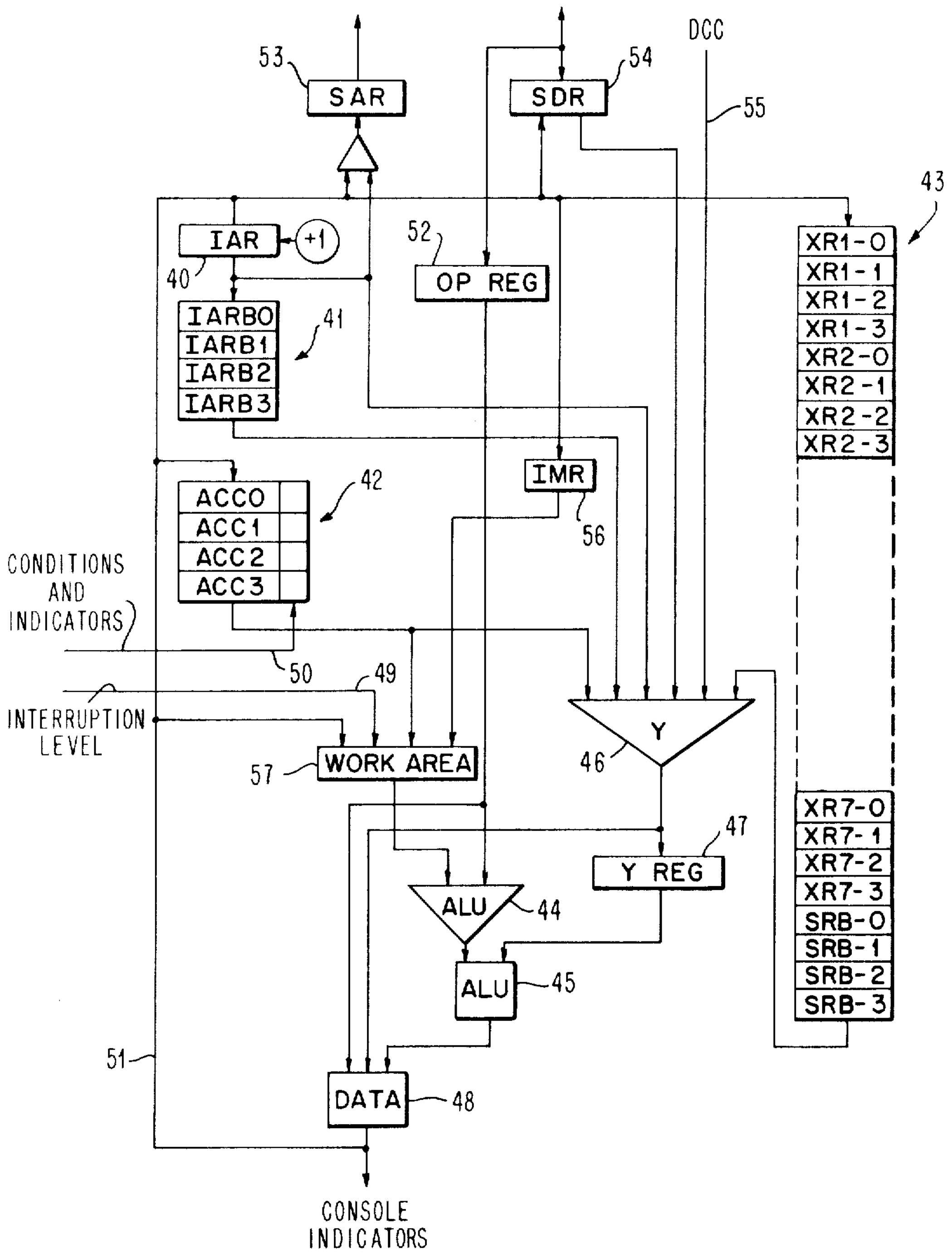
FIG. 2 contains a block diagram of pertinent elements in the processor organization of the FIG. 1 environment.

The general elements of a multiple priority level driven data processor organization are shown in FIGS. 1 and 2. The operating interrelationships of the elements shown in FIGS. 1 and 2 are described in considerable detail in application Ser. No. 194,075, "Data Acquisition and Control System" by M. I. Davis, J. M. Loffredo, P. L. Rickard and L. E. Wise which was filed on Oct. 27, 1971 and assigned to the same assignee as this application. The general operating interrelationships of the main elements of FIGS. 1 and 2 will be briefly discussed herein for background purposes.

The processor or CPU 10 contains a main storage 11 and arithmetic logical unit and CPU controls 12 which are essentially the same as their counterparts in the prior art processors. However, processor 10 as shown is assumed to be capable of handling four levels of interrupt priority servicing. To this end, registers and conditions 13 – 16 each contain sufficient logical circuitry for operating with ALU and controls 12 as well as main storage 11 independently of each other. Priorty level control logic 20 responds to the highest interrupt priority servicing request present by actuating the registers and conditions circuit 113 – 16 corresponding to that level of interrupt while effectively isolating all other register and condition circuits. For instance, if an interrupt level 2 is being processed by registers and conditions circuits 15, circuits 13, 14 and 16 are inactive. If an interrupt level 1 request is received over bus 21 from interrupt request latches 31 in channel 25, priority level control logic 20 will decondition circuit 15 whenever an interruptable point is reached in its processing and actuate registers and conditions circuits 14. Thus, the operation of storage 11, and ALU and CPU controls 12 in conjunction with either circuit 13, 14, 15 or 16 is tantamount to four redundant processors. This is a significant part of what has been sometimes referred to as a "virtual processor" organization.

Current level latches 22 and in-process latches 23 assist the priority level control logic 20 in maintaining control of the processor organization. The processing of a level 2 interrupt results in setting of the level 2 latch in latches 22. The appearance of a service request from level 1 latch of latches 31 causes logic 20 to clear the level 2 current level latch 22, set the level 1 current level latch 22 and also set the level 2 in process latch 23. Subsequently the level 1 interrupt processing will be completed and the release of level 1 signified to logic 20. Logic 20 then clears the level 1 current level latch 22 and inspects in-process latches 23. In the example mentioned, it would then find that a level 2 interrupt processing had been itself interrupted and thus the level 2 current level latch will be set and the registers and conditions circuit 15 for level 2 reactuated to retrieve control of the processor for continuation of that interrupt level processing. The interrelationships of the interrupt level correlated registers and conditions circuits with the other CPU 10 elements will be more fully appreciated from the description for FIG. 2 contained later herein.

Channel 25 essentially provides a vehicle for obtaining control of CPU 10 in response to any of a plurality of possible conditions. For instance, an I/O device can present its interrupt request over bus 26. As can be more fully appreciated from co-pending application Ser. No. 194,075, the I/O interrupt request would be presented with its specified interrupt level along with certain pertinent information relative to the identity of the interrupting source, the device status, and the programming subroutine to be called for processing that interrupt. The CPU 10 can contend for interrupt processing via cable 27. That is, a program being executed in CPU 10 might designate that it should be processed in contention with other priorities of interrupt request. Thus, the data correlated with the interrupt priority level, the identity of the interrupting source and the handling subroutine to be used would typically be loaded over bus 27 into the program set interrupt buffers 28. These interrupts then contend over bus 33 along with any other devices which might contend for servicing such as the native devices, timers, etc. 32 over cable 34. Contention, stacking and request accept logic 29 will respond to the various interrupt requests present to determine which shall be granted access to the interrupt buffer with registers 30 through gates 35 by any desired algorithm. For instance, it may be determined that a program interrupt set into buffer 28 on level 1 is to have priority over and I/O interrupt also assigned level 1 appearing on bus 26. If desired, logic 29 can store an indication that a program set level 1 has been accepted and a pending level 1 interrupt from another source is to be accepted before honoring another program set level 1 request. Such an arrangement could be adapted from the basic teachings of Pat. No. 3,543,242 entitled, "Multiple Level Priority System," by Adams et al. and assigned to the same assignee as this application. The critical data relative to the interrupt to be processed is sequentially gated into the appropriate level 0 – 3 of interrupt buffer registers 30 and then the interrupt request latch 31 for the appropriate level is set. Note that service requests can be gated into buffer register 30 even while an interrupt is being handled in CPU 10.

In a typical operation, a program providing supervisory functions and transferring initiating information is loaded into storage and initiated by transferring control information to the program interrupt buffers 28. Initially there will be no other contending interrupt requests and, therefore, data can be transferred under control of the supervisory program. Eventually interrupt requests will be received over the interface connection 26 such as might be originated by communications devices or other I/O attachments. As mentioned, these interrupt requests contend with the native devices, timers, etc. 32 along with program set interrupts contained in buffer 28. Buffer 28 is shown as having four levels of priority interrupt. The logic 29 will determine the tie breaking decision and allocate access to the interrupt buffer register 30 corresponding to the interrupt level associated with each request. Only one request can be honored at a time and it is loaded into buffer 30 until CPU 10 can accept an interrupt for that particular level. When an interrupt is honored for a given level, the data contained in the applicable buffer register 30 is transferred to the appropriate control elements in block 12 as well as being placed in the appropriate register and conditions circuits 13 – 16 corresponding to that level. In addition, the interrupt request latch 31 for the accepted level is reset so that logic 29 can load another request into buffer 30 for that level. Although the FIG. 1 environment is shown as using four levels of priority interrupt, it will be understood that greater of lesser numbers of levels can be used.

FIG. 2 illustrates some of the pertinent elements in the processor itself. It includes an instruction address register 40 which selects the particular instructions to be executed from storage in the well-known manner. The other elements including the operation register 52, storage address register 53, storage data register 54, mask register 56, work area 57, *y*-funnel 46, register 47, ALU funnel 44, ALU logic circuit 45 and data register buffer 48 essentially all perform in controlling the CPU operation in the manner which is wellknown in the art. In addition, each priority interrupt level has an instruction address backup register 41 designated IARB 0 – IARB 3 corresponding to the four levels of priority interrupt. Each priority level also has an accumulator and conditions and indicator storage section 42 allocated to it. The interrupt levels also have a plurality of index registers (XR) and status backup registers (SRB) 43 assigned to those levels. Thus, operation of the processor under control of a third level priority interrupt will involve use of IARB 3, ACC 3 and its associated conditions and indicator storage along with XR1 - 3, XR2 - 3 through XR7 - 3 and SRB - 3. While these elements are controlling the operation of the processor, their counterparts for levels 0, 1 and 2 are all held in the inactive state by the priority level control logic even though an interrupt request on any of those levels will interrupt the level 3 processing when they occur provided they are allowed by the interrupt mask register 56.

Whenever a higher level priority interrupt occurs, the aforementioned registers, accumulators and the like for the lower level are simply left in the state they were in at the point of interrupt and control turned over to the higher level. This permits a rapid machine return to the lower priority level for continuation of its processing when all higher level interrupts have been honored. It can be seen that IARB 0, ACC 0 and its associated conditions and indicator store along with XR1 - 0 through XR7 - 0 all correspond to the registers and conditions circuit 13 for level 0 shown in FIG. 1. The direct channel control 55 permits the transfer of pertinent information contained in interrupt buffer register 30 of FIG. 1 into appropriate register positions corresponding to an interrupt request which is about to be honored.

Interrupt level 49 permits the transfer of pertinent information encoded from the interrupt request latches 31 of FIG. 1 into appropriate register positions of work area 57. These bits in work area 57 are combined with the bits from direct channel connection DCC 55 to determine the starting address of the subroutine to be executed as a result of the interrupt as described in copending application Ser. No. ALU 44 and Y46 are funnels which allow the selection of one of a multiplicity of buses to be the source of information to be transferred to a single destination bus. Work area 57, Y Reg. 47 and Data 48 are registers made up of a multiplicity of latches. They are used for temporary storage of information during the execution of an instruction. ALU 45 is an arithmetic/logic unit as is widely known and used in existing computers to perform arithmetic and logical functions. The SAR 53, SDR 54, IAR 40, OP REG 52, IMR 56, Work Area 57, Y 46, Y REG 47, ALU Funnel 44, ALU 45 and Data 48 are included only once in a multiple interrupt level processor and are shared by the multiplicity of interrupt levels.

The present invention provides means whereby a program running on one interrupt level in a partitioned, preemptive priority processor along the lines of that described for FIGS. 1 and 2 may control, communicate with and, if necessary, abort the operation of a program on a different priority level. Co-pending application Ser. No. 194,075 describes a processor which for reasons of overhead reduction is controlled by a preemptive priority interrupt mechanism and, in addition, provides a complete set of registers and conditions for each such interrupt level to reduce the overhead associated with task switching when interrupts occur. This has been generally described hereinbefore for FIGS. 1 and 2. The advantages of such a system where responsiveness is required are described in application Ser. No. 194,075. However, such a system by the very nature of the manner in which the instruction address registers, other registers and conditions are partitioned on an interrupt priority level basis tends to preclude level to level communication. The only common medium for such communication is through main storage. Thus, for instance, software running on level 1 has no information relative to the state which software running on level 2 has reached nor can it, if required, cause the execution on level 2 to be suspended. It should be noted that the requirement for level 1 to be able to suspend level 2 operation, start a new operation on level 2, allow this to complete and then restart the original operation on level 2 is important for application of such a partitioned system in a time slicing environment.

As will be described later in conjunction with FIGS. 3, 4, and 5, the present invention adds capability to the partitioned system of FIGS. 1 and 2 to provide these functions. The unique hardware and its operation in conjunction with particular instructions as will be discussed permits a current value of the addressed priority level instruction address register to be made available to the issuing level, permits aborting of the addressed level at the option of the issuing level whether or not the addressed level was in process and allows the issuing level to store the registers and conditions of the addressed level. Given a multiple hardware interrupt level computer, the present invention allows preempting of a program on a different hardware level, initiation of a different program, and preempting that program to reinitiate the original program with no loss of data or continuity of the instruction stream of the original program. In the environment of a computer with complete isolation between multiple hardware interrupt levels such as has been described for FIGS. 1 and 2 and in copending application Ser. No. 194,075, it is not possible to suspend the execution of a program on an interrupt level and then reinitiate it at a later time while maintaining all of the data and continuity of the instruction stream. The present invention provides this capability with the addition of supporting hardware to effect operation in response to instructions for permitting this capability. These instructions will be referred to as read IAR backup (RIB), write IAR backup (WIB), store indicators (STI) and branch and unmask long (BUL). The unique aspects of the first three instructions mentioned in the preceding sentence is that they have the ability to read or change the values of registers or indicators on a selected interrupt level which can be different from the currently active level. This is accomplished without resetting the selected level and allows that level to continue executing instructions when it becomes the active level.

The branch and unmasked long instruction performs a registerless branch while resetting the summary mask and enabling the acceptance of interrupts. This instruction allows the summary mask to be set before entering a non-reentrant subroutine and to leave the mask set until the instruction is executed to return from the subroutine thereby maintaining the integrity of the routine. The use of a registerless branch allows returning from the subroutine with all registers initialized rather than requiring one register for the return address.

Two additional instructions provide an alternate means for selecting the level and register to be read or changed. These are load selected level register LSLR and store selected level register STSR. These provide a more general solution to the communications and interlevel prioritizing controls objective of the present invention.

Figure 4:
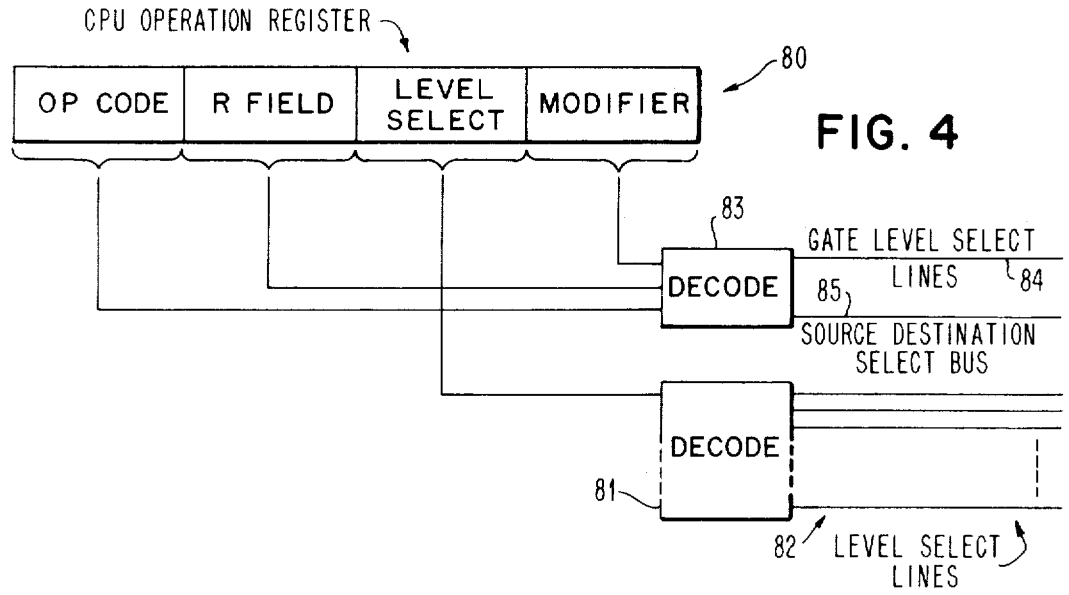
FIG. 4 sets forth an arrangement for responding to a particular instruction for permitting acquisition of data from a processor level different from the current level in coordination with the FIG. 3 circuitry.
Figure 5:
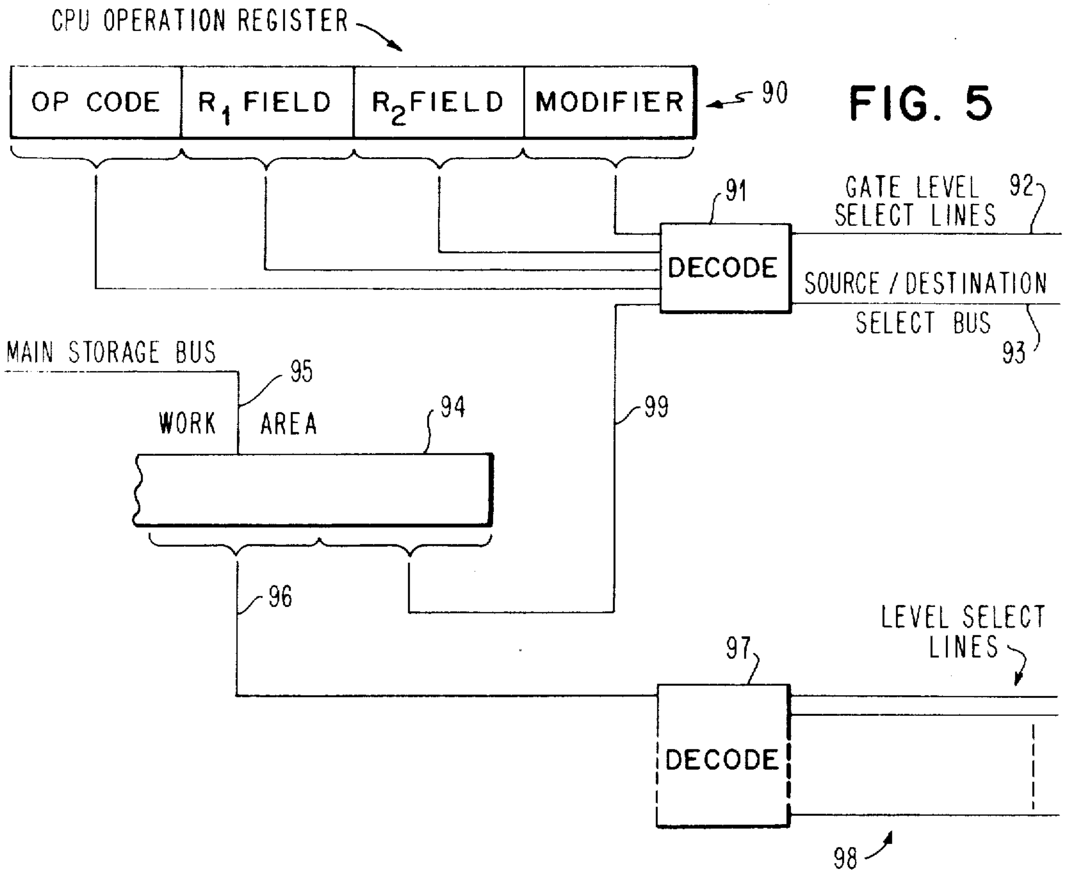
FIG. 5 depicts yet another arrangement for responding to special processor instructions for permitting initialization of a processor level circuit so as to preempt the use of those circuits in conjunction with the circuitry of FIG. 3.

The RIB, WIB and STI instructions are assumed for purposes of this preferred embodiment description to be arranged in a format compatible with the CPU operation register 80 shown in FIG. 4. The Level Select field will be assumed to contain at least two bit positions which are binary encoded with the value of the level selected. The LSLR and STSR instructions will be assumed to conform to the format shown for CPU operation register 90 of FIG. 5 although it will be appreciated that registers 52 in FIG. 2, 80 in FIG. 4 and 90 in FIG. 5 can all be the same registers. For purposes of the preferred embodiment description, it will be assumed that the operation registers and the correlated instructions are 16 bits in length with the bits numbered 0 through 15. A common bit configuration for the operation code such as using bits 0 – 4 designates that one of the instructions RIB, WIB or STI is to be executed. The particular instruction is identified by a unique bit configuration in the modifier field M which might include bits 12 – 15. For instance, if M is hexadecimal 13, the RIB instruction is to be executed. If M is a hexadecimal 14, WIB is being selected while a M of 0 indicates STI.

For execution of the read IAR backup instruction RIB, the contents of the IARB register for the selected level replaces the contents of the register specified by the R field (bits 5 – 7). Whenever the R field is all 0's, the IARB of the selected level will be placed in the accumulator for the selecting level. Since an IARB register may not actually be included for level 0 because it cannot be interrupted, execution of this instruction when the specified level is 0 will result in 0 being loaded in the register identified by the R field. The IARB register selected is unchanged, however. The level is selected by the binary encoded value in bit positions 8 – 11, the level select field in the instruction. The selected level is not reset and thus, if the selected level is pending, it automatically becomes the current level when all higher levels are exited.

The carry indicator of the issuing level is turned on if the selected level is active or in process and pending. If the selected level is not active or pending, the carry indicator of the issuing level remains off. The overflow indicator is unchanged but the results indicators on the issuing level are changed depending upon the operand loaded into the register designated by the R field. The indicators on the selected level are unchanged unless the selected level is the active level.

When executing the write IAR backup instruction WIB, the contents of the register specified by the R field replaces the contents of the IAR backup register on the selected level. AGain, if the R field of the selecting level is all 0's, the accumulator is used. The contents of the register designated by the R field are unchanged. The level is selected by the binary encoded value in the level select bit position 8 – 11 of the instruction. The selected level is not reset and, therefore, if the selected level is pending, it automatically becomes the current level when all higher levels are exited. If a level 0 is selected, the instruction performs no operation (No. Op).

In executing the store indicators STI instruction, the contents of the result, carry and overflow indicators on the level designated by the level select field are stored in the register designated by the R field with an R field of all 0's again representing the current level accumulator. The level is selected by the binary encoded value in bit positions 8 – 11 of the level select field in the instruction. The selected level is not reset. After this instruction is executed, the current level register defined by the original R field will contain a status of the selected level operation. Thus, one bit in this R field defined register can indicate the zero result indicators status of the selected level, another bit the negative result indicator, still another bit the positive result indicator, another the even result indicator, another the carry indicator and still another the overflow indicator. The carry, overflow and result indicators on the selected level are not changed. The result indicators on the current level are changed depending upon the operand loaded into the register on the current level. The carry and overflow indicators on the current level are not changed, however.

The branch and unmasked long BUL instruction is actually executed by the existing hardware shown in FIG. 2. This instruction contains an operation code uniquely identifying itself. When the BUL instruction has been loaded into operation register 52 of FIG. 2, a unique 16 bit address field is loaded into the instruction address register 40 and becomes the address of the next instruction to be executed. The carry, overflow and result indicators are not affected. The summary mask is turned off thereby returning control of higher level interrupts through the contents of the interrupt mask register IMR 56. Interrupts are enabled dependent upon the value of the mask during this instruction. Accordingly, program execution may be "interrupted" prior to execution of the next sequential instruction. The R field, level select and modifier fields are not used for this instruction.

The load selected level register LSLR and store selected level register STSR instructions have a common operation code but are distinguishable by the logic through identifier bit positions in the modifier field. For the LSLR instruction execution, the contents of the store location in main storage as designated by the effective address is loaded into the selected register on the selected level. The level is selected by the contents of the current level register specified by the R1 field in the operation register 90 of FIG. 5. The R2 field selects a current level register which contains a main storage address thus defining the main storage location which is either the target or source of data to be transferred from or into the register designated by the R1 field. For LSLR, the R1 field effectively selects a target register while R2 effectively addresses a source location in main storage. The STSR instruction uses R1 to select a source register and R2 to address a target location in main storage. The work area retains the R1 specified register contents during these transfers. This operation will be described in greater detail later. For LSLR, the register designated by R1 contains two bit positions that select the target register level and contain other bit positions which identify the particular registers on that level. For instance, they can select any of the even index registers, the IAR backup (except on level 0 where it is the IAR if there is no IARBO) or the level status register backup. Loading the level status register backup on the current level does not initialize the carry, overflow, result indicators, bit address indicators and protect key on the current level. The carry and overflow indicators on the current level are not changed whereas the result indicators on the current level are changed depending on the operand loaded. The effective address is the contents of the R2 field.

The level status register backup contents by bit positions are as follows: 00 — byte address indicator No. 0 (BAI0); 01 — byte address indicator No. 1 (BAI1); 02 — zero result indicator (Z); 03 — negative result indicator (N); 04 — positive result indicator (P); 05 — even result indicator (E); 06 — carry indicator (C); 07 — overflow indicator (O); and 12 - 15 — protect key. Note that bit positions 08 - 11 are not used. The execution of this instruction is suppressed if the effective address exceeds the storage size available. An invalid address response is set under these circumstances. This is as the system has been performed in the past.

The store selected level register instruction STSR is executed so that the contents of the selected register on the selected level replaces the contents of the storage location designated by the effective address. The level is again selected by bit positions of the register designated by the R1 field. Bit positions 12 - 15 of that same register are used to select the source register on the select bit level as defined under the load selected level register instruction above. Storing the level status backup register of the current level does not store the current state of the result, carry, overflow, byte address indicators and the protect key. It stores the value left in the backup register by the last preemptive interrupt of that level. The carry and overflow indicators on the current level are not changed while the result indicators are changed depending upon the operand stored. The effective address is the contents of the R2 field. Again, the instruction execution is suppressed and an invalid address indicator set if the effective address exceeds the available storage size. In addition, the instruction is suppressed if the effective address would, if accessed, violate the storage protection mechanism.

The optional abortion of interrupt processing on a given priority level and the capability to access registers and conditions on an addressed level is particularly advantageous wherever time slicing, preemptive time sharing and so-called roll in/roll out operations are desired in a partitioned processor environment. In such a system, significant parameters including the instruction address, arithmetic and logical conditions and index registers are held in entirely separate sets of hardware for each interrupt level. Such operations have not previously been available with prior art apparatus wherein a given program (the issuing level) does not have sufficient knowledge of the addressed program to allow the functions to be performed. This invention now makes it possible for such operations to be performed. If an instruction is to be executed so as to abort an interrupt process, a clock pulse during execution of that instruction will reset the in-process latch 23 of FIG. 1 for the level or levels to be aborted. Under the influence of controls in accordance with this invention, data can be moved from the instruction address register on the addressed level either to main storage or to an index register or accumulator for the issuing level. Similarly, the contents of the indicators for the addressed level may be moved to main storage or to an index register or accumulator on the issuing level. This saving of the instruction address register value and the indicators permits the status of the interrupted program to be recorded. When a new program on the same level is to be initiated, the instruction address register is loaded for the addressed level as are the indicators for the addressed level, either from main storage or from an index register or accumulator on the issuing level. The housekeeping of the index registers and accumulators themselves can be handled by programming without hardware assistance.

Figure 3:
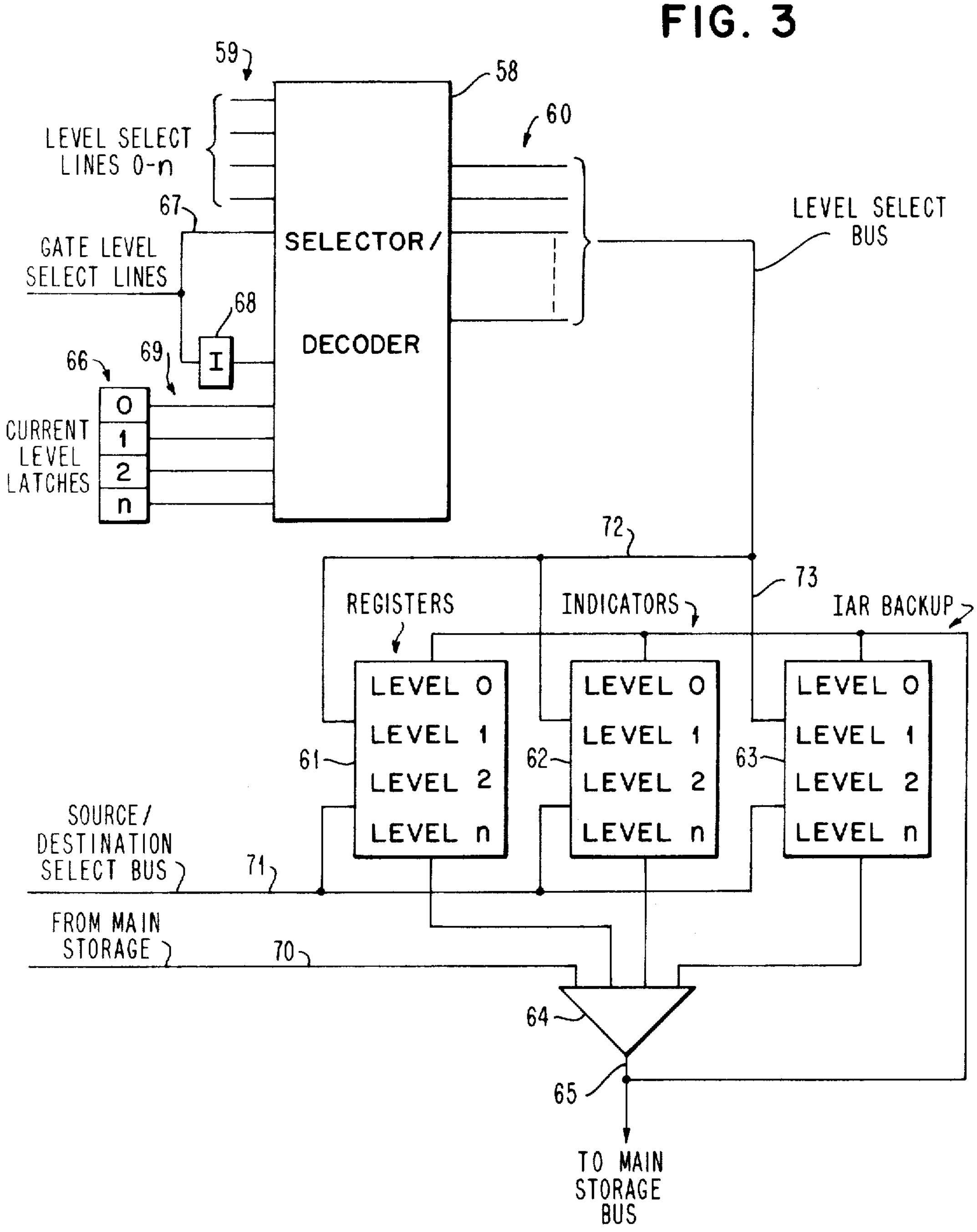
FIG. 3 illustrates the manner in which the present invention can be utilized to expand the flexibility of a system similar to that shown in FIGS. 1 and 2.

FIG. 3 illustrates the interrelationships of the controls and block logic circuitry required to provide interinterrupt level communication on a multiple interrupt level computer such as has been generally shown and described for FIGS. 1 and 2. Block 66 contains multiple latches that are used to select the current active level. Latches 66 are generally equivalent to current level latches 22 of FIG. 1. There is one latch in this block for each interrupt level in the computer. One and only one of these latches will be in the On state at any given time under normal operation. Block 66 drives bus 69 which is passed through selector/decoder 58 depending upon the state of the output of block 68. Bus 69 and the status of the output of inverter 68 are decoded by selector/decoder 58. Selector/decoder 58 drives bus 60. Bus 72 and 73 are merely extensions of bus 60, and are used to select the banks of registers 61, indicators 62, or the IAR backup 63 by level designation. Register 61 represents multiple sets of registers broken up into N blocks of registers designated as levels. Each level may have from one to X registers based upon the requirements of the computer and can include the index and level status backup registers. Bus 72 selects which block of registers for the designated level is active at any given time. Bus 71 then selects the specific register within a level that will be the source or destination for data on bus 65. Indicators 62 represents one register per level for each of N levels. The active set of registers presented by a given level in block 62 is determined by the value on bus 72. The active level in IAR backup 63 is determined by the value on bus 73.

To provide the ability to communicate with a register on a different interrupt level, an alternate entry is required into selector/decoder 58. This is illustrated by bus 59 and control line 67. When control line 67 entitled Gate Level Select Lines is active, then the output of block 68 is inactive and selector/decoder 58 inhibits coupling of bus 69 to level select bus 60. Control line 67 gates bus 59 to selector/decoder 58 and the output appears on bus 60. Now the selection of the active level in the registers 61, indicators 62 and IAR backup blocks 63 is controlled by bus 59. The source/destination register within a given level is still controlled by bus 71 in the normal way.

FIG. 4 illustrates a method of controlling the level select lines designated as bus 59 in FIG. 3 and as bus 82 in FIG. 4. Gate level select line 67 is generated by decode 83 in FIG. 4 and designated as gate level select line 84. Source destination select bus 71 in FIG. 3 is driven by decode 83 and titled Source Destination Select Bus 85 in FIG. 4. The operation of the defined data flow and controls is best illustrated by an example.

The operation to be performed for this example is to read the IAR backup from level 3 into register 5 on level No. 2, the current active level. The read IAR backup instruction is read into the CPU operation register 80, the equivalent to Op Reg 52 in FIG. 2. Decode 83 uses the Op code field and the modifier to determine that the gate level select line 84 should be active. Decode 81 uses the level select field to determine which level should be selected and placed on level select lines 82 and thence input bus 59 in FIG. 3. Selector/decoder 58 of FIG. 3 detects the transition in gate 67 and uses bus 59 as its input. Inverter 68 detects the transfer of gate 67 and inhibits bus 69 from being used by selector/decoder 58. Selector/decoder 58 presents the new selected level on bus 60 which is fed through bus 72 and 73 to the registers, indicators and IAR backup. Decoder 83 puts a value on bus 85 which is passed by means of bus 71 to the IAR backup 63. The values on bus 73 and bus 71 select the IAR backup register for level 3 of IAR backup 63. This value is transferred to the assembler and temporary storage unit 64. The value is also placed upon bus 65. At a later time in the instruction cycle, decoder 83 uses the R field to change the value on the source destination bus 85. In addition, decoder 83 inhibits gate 84. The clock pulses used to bring about this change in state are not shown because they are normal internal computer controls. Gate 67 in FIG. 3 causes selector/decoder 58 to inhibit bus 59 and activate bus 69. The assumption was made for the purpose of this illustration that the current active level was level 2; therefore, current level latch 2 in block 66 will be active and presented on bus 69. Selector/decoder 58 will now present current level 2 on bus 60. The new source/destination information provided by decode 83 is presented to bus 71 and selects register 5 of level 2. The value on bus 71 designates register 5 level 2 as the destination. Therefore, the information retained in temporary storage 64 is presented on bus 65 and set into register 5 on level 2 of register group 61.

The above illustration has caused the IAR backup register on level 3 in block 63 to be stored into register 5 on level 2 of block 61, the currently active level. This operation allows the program executing on level 2 to know the address of the next instruction to be executed on level 3 when level 3 becomes active. If the decision has been made to change the execution of the program on level 3 to a different program, then the value in the IAR backup register on level 3 should be changed. Changing the IAR backup on level 3 accomplishes the same function as a branch instruction in an instruction stream.

An additional function which is required to effectively control one interrupt level from a different interrupt level, is the ability to determine if the selected interrupt level is currently pending and capable of becoming the current active level at some later time. In other words, was that level active at the time that a preempt interrupt occurred which gave control to the higher priority level which is now in operation. Without this information, it is impossible to determine whether the selected level could become the active level when the control is released to that level. To illustrate this point, consider FIG. 1. Current level latches 22 perform the same function as current level latch 66 in FIG. 3. They determine which level is the current active level within the CPU. In Process Latches 23 are used to identify those levels which have been preeempted by higher priority interrupts and which will regain control when the higher priority interrupt levels are released and control is returned to the lower priority levels. In the example of the read IAR backup instruction, the level 3 IAR register contained in block 16 was read from level 2 in block 16, the currently active level. During the execution of this instruction, latch 3 of the in-process latches block 23 is tested to determine if it is in the on state. If latch 3 in block 23 is in the on state, an indicator is set on the current active level to indicate that the level is pending. If latch 3 of block 23 is in the off state, an indicator on the current active level is set in the off state to indicate that the selected level is not pending. In an specific implementation on the IBM System/7, the indicator on the current level chosen to represent this condition is the carry latch. The carry latch needs no further clarification because it is a standard element in the implementation of most computers. The carry latch is represented in FIG. 1 as one of the conditions contained in blocks 13, 14 15 and 16. In this example, the carry latch in block 15 would be set to the same value as latch 3 of block 23.

Under some circumstances it may be necessary to terminate the processing on a lower interrupt level. To accomplish this, it is necessary to turn off the in process latch associated with that specific interrupt level. For example, if it was desired to terminate the processing on interrupt level 3 from interrupt level 2, then latch 3 of block 23 in FIG. 1 would be set to the off state. This function is performed by the inspect IAR backup instruction IIB. The inspect IAR backup instruction IIB uses the IAR backup register on the selected level as the source and a register on the current level as the destination in the same manner as the read IAR backup instruction discussed above. In addition to this function, issuing the inspect IAR backup instruction causes the selected level to be aborted. That is, if the selected level is level 3 and latch 3 of block 23 in FIG. 1 is on, issuing an inspect IAR backup instruction would cause latch 3 to be set to the off state. Therefore, if level 2 where the current level, level 3 will not become active when the CPU is released by level 2. Level 3 will not become active until it receives an external interrupt from interrupt request latch 3 in block 31 in FIG. 1. If latch 3 in block 31 is set on, bus 21 becomes active and the priority level control logic in block 20 will determine whether a level 3 priority interrupt can be honored. If a level 3 priority interrupt can be honored, then latch 3 of block 23 will be set on. And in addition, latch 3 of block 22 will be set on and level 3 will become the current active level within the CPU provided there is neither a higher interrupt level request present nor an interrupt mask set to block level 3 interrupts.

The conditions referred to in blocks 13, 14 15 and 16 in FIG. 1 represent specific control latches dedicated to each interrupt level within the CPU. An example of some of these conditions are carry, overflow, and result indicators associated with arithmetic and logic functions on a given level. To provide the capability of saving the values represented by the conditions on a selected level, the Store Indicator instruction is implemented on the IBM System/7. This instruction stores the contents of the condition register on the level designated by the level field into the register designated by the R field on the current level. The general description of this instruction is provided under the Store Indicators instruction description contained herein. The operation of the instruction is best illustrated by an example.

The illustrative operation to be performed is to read the condition register from level 3 into register 5 on level 2, the current active level. The store indicators instruction is read into the CPU operation register 80 of FIG. 4. Decode 83 uses the Op code field and the modifier to determine that the gate should be active. Decode 81 uses the select field to determine which level should be selected and placed on level select lines 82 and thence to bus 59. Selector/decoder 58 in FIG. 3 detects the transition in gate 67 and uses bus 59 as its input. Inverter 68 detects the transition of gate 67 and inhibits bus 69 from being used by selector/decoder 58. Selector/decoder 58 presents the new selected level on bus 60 which is fed through bus 72 to the indicators 62. Decoder 83 puts a value on bus 85 which is passed by means of bus 71 to indicators 62. The values on bus 73 and bus 71 select the level 3 register in indicators 62. This value is transferred to the assembler and temporary storage unit 64. The value is also placed upon bus 65. At a later time in the instruction cycle, decoder 83 uses the R field to change the value on the source destination bus 85. In addition, decoder 83 inhibits gate 84. Clock pulses used to bring about this change in state are not shown because they are well known internal computer controls. Gate 67 in FIG. 3 causes selector/decoder 58 to inhibit bus 59 and activate bus 69. The assumption was made for the purpose of this illustration that the current active level was level 2; therefore, current level latch 2 in block 66 will be active and presented on bus 69. Selector/decoder 58 will now present current level 2 on bus 60. A new source destination information provided by decode 83 is presented to bus 71 and selects register 5 of level 2. The value on bus 71 designates register 5, level 2 as the destination. Therefore, the information retained in temporary storage 64 is presented on bus 65 and set into register 5 on level 2.

To illustrate the use of the write IAR backup instruction, consider the following example which assumes that data from register 6 on the current active level 2 will be transferred to the IAR backup register on level 3. The write IAR backup instruction is placed into register 80 in FIG. 4 by normal CPU operation. The OP code and modifier are decoded by decode 83 and placed on bus 85. Data on bus 85 is transferred to bus 71 in FIG. 3 and the value selects register 6. Selector/decoder 58 uses bus 69 since gate 67 is inactive. Current level latch 2 is placed on bus 69 and on bus 60 by selector/decoder 58. This value is placed on bus 72 to select the level 2 registers in block 61. The value on bus 71 specifies that register 6 is the source register; therefore, the value in register 6 is placed into funnel and temporary storage unit 64. At a later time in the CPU cycle, decode 83 raises gate 84 which causes gate 67 at the input to selector/decoder 58 to change. Gate 67 then inhibits bus 69 and enables bus 59. Bus 59 contains a value from decode 81 which represents the value obtained from the level select field of register 80. Therefore, bus 60 and consequently bus 73 will select the level 3 IAR backup register in block 63. Bus 71 will designate the IAR backup register on level 3 as the destination register. The value from temporary storage 64 will be placed on bus 65 and, consequently, set into the IAR backup register on level 3.

The above two examples have been used to illustrate an implementation which transfers information from a register on the current active level to a register on a different selected level or from a register on a selected level to a register on the current active level. FIG. 5 illustrates the controls and data flow required to provide a somewhat different implementation. This arrangement uses the contents of a register on the current active level to select the level and the register on that level as the source or destination register. When a Load Selected Register Instruction is executed, the data is fetched from main storage and loaded into the register. On a store operation, the data is transferred from the register to main storage. This second method is more complex to implement but provides for reentrant code and a shorter programming loop to be executed for the loading and storing of data into the registers on a different level. It represents a generalized approach to the problem posed above.

To illustrate the implementation of this more generalized method, consider this example. The objective of this example is to take the contents of an IAR backup register on level 3 and preserve that information for later use. In this example, the information is taken from IAR backup on level 3 and put it into a storage location. The storage location to be used will be designated by a register on the current level. The R2 field in the instruction designates the register which contains the storage address. For the purpose of this example, we will assume that the value in the R2 field is equal to 4. The value in the R1 field is equal to 6. Therefore, the contents of register 6 on the current level will be used to select a level and register as the source of the data to be transferred to storage.

The generalized description of this instruction which performs this function is covered in the Store Selected Level Register instruction description. The specifics of the implementation of this instruction are as follows. The CPU places the instruction in the CPU operation register 90 in FIG. 5. Decoder 91 uses the Op code, R2 field and modifier field of 90 to determine register to be specified on bus 93. This is passed to bus 71 of FIG. 3 to select the register that contains the storage address. At this time, bus 72 specifies that the current active level is being used and, therefore, register 4 from level 2 will be used as the source. The contents of that register will be placed into funnel 64 and on bus 65. This information will be transferred to the Storage Address Register 53 in the CPU as shown in FIG. 2. The operation of SAR 53 will not be described in detail since its functions are well known and ancillary to the present invention. After this function has been accomplished, decode 90 uses the OP code field, R1 field and modifier field of 90 to select register 6 on the current level via bus 93 and bus 71 as the source register. The contents of register 6 on the current level are placed in the funnel and temporary storage unit 64. They are transferred through bus 65 to bus 95 and set into work area 94 in FIG. 5. At this time, decode 91 uses the contents of work area 94 to determine the value to be placed on bus 93 and transferred to bus 71. In addition, decode 91 causes gate 92 to become active. Gate 92 is connected to gate 67 in FIG. 3 and causes selector/decoder 58 to use the contents of bus 59 rather than 69. Selector/decoder 58 uses the value on 59 to determine the value to be placed on bus 60. The value placed on bus 60 is transferred via bus 73 to IAR backup 63. The IAR backup on level 3 is selected by the contents of bus 73 and bus 71 and the contents are placed into funnel 64 and on to bus 65 for transfer to main storage through the Storage Data Register 54 of FIG. 2. The CPU causes a main storage write and the value that was obtained from the IAR backup register on level 3 is set into the main storage location designated by the Storage Address Register 53 previously loaded by the CPU.

This example illustrates how the contents of a register on the current level can be used to select the level and register that will be used as a source for data which will be transferred to storage. The same principle is used in selecting the register on a different level to be used as a destination for data brought from the main storage in the CPU. The general description of the instruction used for this purpose is contained under the Load Selected Level Register instruction described elsewhere herein.

To illustrate the use of this instruction, consider another example. The objective of this example is to take the contents of a storage location and load it into the IAR backup register on level 3 while executing code on interrupt level 2. The R2 field in the instruction designates the register which contains the storage location address. For the purpose of this example, we will assume that the value in the R2 field is equal to 4. The value in the R1 field is equal to 6. The contents of register 6 on the current level will be used to select a level and register as the destination of the data to be transferred from storage.

The specifics of the implementation of this instruction are as follows. The CPU places the instruction in the CPU operation register 90 in FIG. 5. Decoder 91 uses the Op code, R2 field and modifier field of 90 to determine the source register to be specified on bus 93. This is passed to bus 71 to select a register that contains the storage address. At this time, bus 72 specifies that the current active level is being used and; therefore, register 4 of lever 2 will be used as the source. The contents of that register will be placed into 64 and on bus 65. This information will be transferred to the storage address register 53 in the CPU illustrated in FIG. 2. The CPU will cause a storage read operation to be initiated. At this time, decode 90 uses the Op code field, R1 field and modifier field of 90 to select register 6 on the current level via bus 93 and bus 71 as the source register. The contents of register 6 on the current level are placed in funnel and temporary storage unit 64. They are transferred through bus 65 to bus 95 and set into work area 94 in FIG. 5. Decode 91 uses the contents of word area 94 to determine the value to be placed on bus 93 and transferred to bus 71. In addition, decode 91 causes gate 92 to become active. Gate 92 is connected to gate 67 in FIG. 3 and causes selector/decoder 58 to use the contents of bus 59 rather than 69. Selector/decoder 58 uses the value on 59 to determine the value to be placed on bus 60. The value placed on bus 60 is transferred via bus 73 to IAR backup 63. The IAR backup register on lever 3 is selected by the contents of bus 73 and bus 71. The contents of the storage location designated by the contents of the storage address register are placed on bus 65. The contents of bus 65 replace the contents of the IAR backup register on level 3 in block 63. Thus, the contents of a storage location have been placed into a register on a selected level other than the current active level within the CPU.

The example given describes the loading of a specific register, namely the IAR backup register on level 3. It should be kept in mind, however, that by using a different bit combination in work area 94 that any register on any level including the current active level could be selected and either loaded or stored as the case may be.

This description defines and describes additional functions which can be added to a hardware driven multiple interrupt level computer to provide the ability for one interrupt level to control and/or communicate with the other interrupt levels. An important element to this capability lies in the selector/decoder 58 in FIG. 3. This block provides for multiple sources for bus 60. By switching from one source to another during the execution of an instruction, the CPU can select which interrupt level will be used as a source or destination for data at any time. Although separate special instructions have been described for performing reading and writing relative to an addressed level, it will be understood by those having normal skill in the art that these can both be performed by a single special instruction if desired with appropriate modification to the supporting apparatus. For instance, three fields or groups of data in such a special instruction could effect a sequence including: selecting a register on an addressed level, transferring the contents of the addressed level registers in current level register positions or in a main storage location, and transferring preempting program data to the registers of the addressed level. This could save the time required for at least one instruction execution.

Note also that, by monitoring the state of the in process 23 in FIG. 1, it can be determined that it is not necessary to read the registers of an addressed level if there was no interrupted processing being retained in that level.

By this invention as described for the preferred embodiments, it is not possible during processing of a current level to inspect the state of another level and decide whether or not to permit preemption of its processing. The processing of the current level may require execution of an interrupt processing subroutine on another level in order to complete processing of the current level. Under those circumstances, the state of the interrupted level is stored and the group or set of control registers or the like on the interrupted level are preempted by data for performing the task needed to complete the current level task. The execution of the preempting routine on a level lower than the current level can be permitted by setting the interrupt mask register so as to isolate the current level until the preempting routine is completed. Thereafter the preempted routine is returned to the interrupted level and can eventually continue processing to completion without any adverse impact from the intervention.

For a time slicing operation, a time can be used to clock the time span to be allocated each user. The interrupt handling routine for responding to interrupts from that timer at the end of each slice can effectively control a main storage queue of control register states for each user. The user programs are executed on a level lower than the timer interrupt. As a timer interrupt occurs, the state of the registers and controls on this lower level are transferred to the end of the queue and the data at the top of the queue transferred to the lower level registers. Thus, user access to the process is allocated on a first-in/first-out basis.

Although the invention has been particularly described and shown relative to the foregoing embodiments, it will be understood by those having normal skill in the art that various other changes, additions, and embodiments may be made without departing from the spirit of this invention.

What is claimed is:

1. In a data processor having a common main storage and a common data processing section both of which are controlled by one of a plurality of groups of control logic each including all necessary elements such as an instruction address register, accumulator, one or more index registers or the like for autonomously executing a program, said groups of control logic having a respective priority level assigned thereto, said data processor including means for actuating the said control group having a priority corresponding to the highest priority service request presented to said data processor while retaining the said control groups of any lower level priority which have been interrupted in suspended isolation until all higher level priority servicing is completed, the improvement comprising means responsive to an instruction on a current level for addressing at least one of the elements in the control logic group for another priority level, detecting means for providing an indication that processing under control of the addressed said control logic group has been interrupted, means responsive to said detecting means indication for storing the contents of the elements in the addressed said control logic group sufficient to reinstate the interrupted processing, and means transferring data to elements of said addressed control logic group for causing execution of processing on said another priority level different from the interrupted processing.

2. Apparatus in accordance with claim 1 which further includes means operable after completion of said different processing for transferring the said element contents from said storing means to said addressed control logic group, and means for permitting said addressed control logic group to continue with said interrupted processing whenever no processing is being performed by a said control logic group having a higher priority level.

3. In a processor having multiple registers each capable of autonomously performing program executions with common main storage and logic circuitry including an operation register wherein priority level control logic actuates the use of said registers having highest priority until its execution is complete while isolating all other said registers, apparatus responsive to presence in said operation register of a special instruction having at least first and second fields comprising means responsive to said first field for addressing one of said registers having a priority level other than the current priority level, means for temporarily storing the contents of the said addressed one of said registers, a storage location, and means operable subsequent to said storing means and responsive to said second field for transferring said storing means content to the said storage location.

4. Apparatus in accordance with claim 3 wherein said storage location is a register position for the said multiple registers of the priority level executing said special instruction.

5. Apparatus in accordance with claim 3 wherein said storage location is a location in said main storage having an address designated by said second field.

6. Apparatus in accordance with claim 3 wherein said special instruction includes a third field, said apparatus further including means for entering data contained in said third field in the said registers addressed by said first field.

7. In a processor having a multiplicity of control register groups each assigned a priority level relative to each other and each of which operates with a common main storage and processor logic including an operation register for executing programs wherein enabling logic responds to requests for service from any of a plurality of sources by enabling the said control register group having a priority level corresponding to the highest priority level associated with any service requests present at any given time so that said highest priority control register group can execute a program in conjunction with the common processor groups while all other control register groups are isolated, an improvement for responding to the presence in said operation register of a special instruction having at least first and second fields comprising means responsive to said first field for addressing a location in main storage, means responsive to said second field for selecting a said control register group having a priority level different from the currently active priority level, and means for transferring the information contained in said addressed main storage location to the said selected control register group, whereby a current priority level program execution can control the program to be executed on the priority level corresponding to said selected control register group regardless of the previous state of said selected control register group.

8. In a processor having multiple groups of control registers, a common main storage and common processor logic including an operation register wherein each of said groups is capable of autonomously executing programs in conjunction with the common main storage and logic and wherein each of said groups is assigned a respective priority level relative to each other, an improvement comprising means responsive to a plurality of service requests each having a priority level associated therewith for enabling the said control register group having a priority level corresponding to the highest priority level service request present while isolating all other said control register groups, means responsive to the presence in the operation register during execution of a current level program of a special instruction having first and second fields and including a. means responsive to said first field for deactuating said enabling means and selecting at least one register in a said group having a priority level different from said current level, b. means for temporarily storing the contents of said selected register, and c. means for causing said enabling means to reselect the level of said special instruction, means for retaining data, and means responsive to said second field for transferring the contents of said temporary storing means to said retaining means.

9. Apparatus in accordance with claim 8 wherein said retaining means is at least one register in said current level group which is identified by said second field, and said transferring means responds to said second field by addressing said at least one current level group register for transferring said temporary storing means contents thereto.

10. Apparatus in accordance with claim 8 which further includes means responsive during execution of said current level program to the presence in said operation register of a second special instruction having first and second fields wherein said means for deactuating said enabling means responds to the first field of said second special instruction for selecting at least one register in a said group having a priority level different from said current level, said second special instruction responsive means including second means for retaining data, and means responsive to the second field of said second special instruction for transferring data from said second retaining means to the said selected register.

11. Apparatus in accordance with claim 10 wherein said retaining means is a location in main storage the address of which is specified by said second field of said second special instruction.

* * * * *